United States Patent
Sasaki

(10) Patent No.: US 9,864,765 B2
(45) Date of Patent: Jan. 9, 2018

(54) ENTRY INSERTION APPARATUS, METHOD, AND PROGRAM

(71) Applicant: NEC Corporation, Minato-ku, Tokyo (JP)

(72) Inventor: Shigero Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 14/434,629

(22) PCT Filed: Jun. 10, 2013

(86) PCT No.: PCT/JP2013/065929
§ 371 (c)(1),
(2) Date: Apr. 9, 2015

(87) PCT Pub. No.: WO2014/061305
PCT Pub. Date: Apr. 24, 2014

(65) Prior Publication Data
US 2015/0278259 A1    Oct. 1, 2015

(30) Foreign Application Priority Data
Oct. 16, 2012 (JP) .................................. 2012-229060

(51) Int. Cl.
*G06F 17/30* (2006.01)
*G06F 9/38* (2006.01)

(52) U.S. Cl.
CPC ...... *G06F 17/30306* (2013.01); *G06F 9/3887* (2013.01); *G06F 17/30587* (2013.01); *G06F 17/30961* (2013.01)

(58) Field of Classification Search
CPC .................................................. G06F 17/30327
USPC .................. 707/673, 696, 711, 752, 999.007
See application file for complete search history.

(56) References Cited

U.S. PATENT DOCUMENTS

2011/0252067 A1*  10/2011  Marathe ............ G06F 17/30958
707/797

OTHER PUBLICATIONS

International Search Report for PCT Application No. PCT/JP2013/065929, dated Jul. 9, 2013.
R. Bayer and E. McCreight, "Organization and Maintenance of Large Ordered Indexes," Acta Infomatica, vol. 1, No. 3, pp. 173-189, 1972.
D. Corner, "The Ubiquitous B-tree," ACM, Computing Surveys, vol. 11, No. 2, pp. 121-137, Jun. 1979.
T. J. Lehman and M. J. Carey, "A Study of Index Structures for Main Memory Database Management Systems," International Conference on Very Large Data Bases, pp. 294-303, Aug. 1986.

(Continued)

*Primary Examiner* — Baoquoc N To

(57) ABSTRACT

An entry insertion apparatus (2000) inserts an entry into a node (3000) having a plurality of partial areas (3020) in which W (W being a positive integer equal to or greater than 2) or less entries are stored. Each entry can be searched for using an SIMD instruction to execute the same processing for the W entries in parallel. The entry insertion apparatus (2000) includes an insertion unit (2020) that inserts a new entry into the partial area (3020) in which the number of stored entries is 1 or more and less than W among the plurality of partial areas (3020), and a sorting unit (2040) that sorts the entries stored in the partial area (3020) when the number of entries stored in the partial area (3020) into which the new entry has been inserted is W.

10 Claims, 12 Drawing Sheets

(56) References Cited

OTHER PUBLICATIONS

J. Rao and K. A. Ross, "Making B+-Trees Cache Conscious in Main Memory," ACM, ACM SIGMOD International Conference on Management of Data, pp. 475-486, 2000.

J. Zhou and K. A. Ross, "Implementing Database Operations Using SIMD Instructions," ACM, ACM SIGMOD International Conference on Management of Data, pp. 145-156, 2002.

C. Kim, J. Chhugani, N. Stish, E. Sedlar, A. D. Nguyen, T. Kaldewey, V. W. Lee, S. A. Brandt, and P. Dubey, "FAST: Fast Architecture Sensitive Tree Search on Modern CPUs and GPUs," ACM, ACM SIGMOD International Conference on Management of Data, pp. 339-350, 2010.

Benjamin et al., k-Ary Search on Modern Processors, Proceedings of the Fifth International Workshop on Data Management on New Hardware, [online], 2009, pp. 52-60, [retrieved on Jun. 25, 2013] Retrieved from ACM Digital Library.

\* cited by examiner

FIG. 5
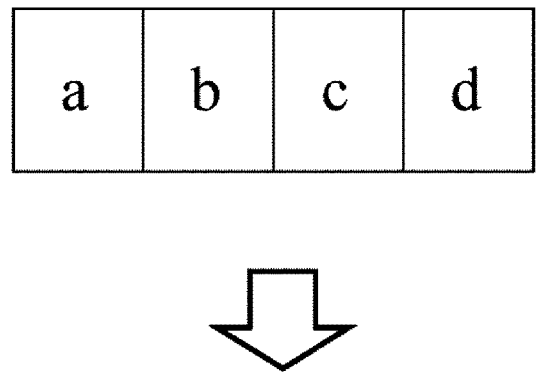
(a)
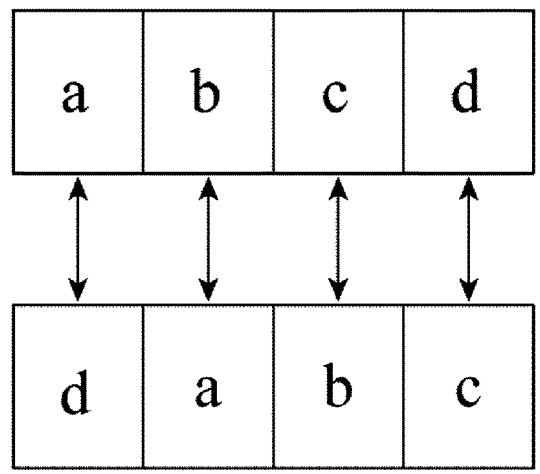
(b)

FIG. 10
ENTRY TO BE DELETED
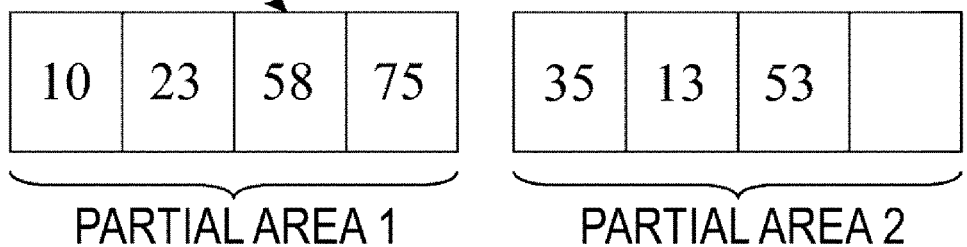
(a)
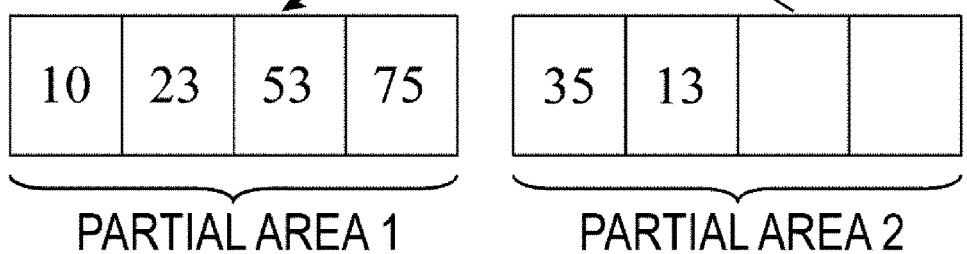
(b)

ENTRY INSERTION APPARATUS, METHOD, AND PROGRAM

This application is a National Stage Entry of PCT/JP2013/065929 filed on Jun. 10, 2013, which claims priority from Japanese Patent Application 2012-229060 filed on Oct. 16, 2012, the contents of all of which are incorporated herein by reference, in their entirety.

TECHNICAL FIELD

The present invention relates to an entry insertion apparatus, method, and program.

BACKGROUND ART

The time required to search data can be shortened by giving an index to each piece of data that is a search target to constitute an index tree. Specifically, when searching for data, the index given to the data is searched from the index tree instead of directly searching for the data. The data can be acquired based on the index acquired as a search result.

The index tree is a data structure in tree structure in which nodes, each being a data structure including a plurality of entries, are connected. The entry is an index or an index level that is used to search for an index.

There are various types of index trees. For example, Non-Patent Documents 1 and 2 describe an index tree called B+-tree. Non-Patent Document 3 describes an index tree called T-tree. Non-Patent Document 4 describes an index tree called CSB+-tree.

Non-Patent Document 5 discloses a method using a single instruction multiple data instruction (SIMD instruction) for search of a node to which an index is given. The SIMD instruction is an instruction to execute the same processing in parallel for a plurality of pieces of data.

Non-Patent Document 6 discloses a method of rapidly performing search of an index using SIMD instructions. Specifically, in the above-described method, a sub-tree consisting of entries included within a node is formed within the node. Further, in the above-described method, a small tree consisting of entries included within the sub-tree is formed within the sub-tree. Also, in the above-described method, a size of the node is the same as a page size managed by an operating system (OS). Further, in the above-described method, a size of the sub-tree is set equal to a cache line size of a CPU. Furthermore, in the above-described method, the size of the small tree formed within the sub-tree is set equal to the number of pieces of data that can be targets of the SIMD instructions at one time.

RELATED DOCUMENT

Non-Patent Document

[Non-Patent Document 1] R. Bayer and E. McCreight, "Organization and Maintenance of Large Ordered Indexes," Acta Infomatica, Volume 1, No. 3, pp. 173-189, 1972

[Non-Patent Document 2] D. Comer, "The Ubiquitous B-tree," ACM, Computing Surveys, Volume 11, No. 2, pp. 121-137, 1979

[Non-Patent Document 3] T. J. Lehman and M. J. Carey, "A Study of Index Structures for Main Memory Database Management Systems," International Conference on Very Large Data Bases, pp. 294-303, 1986

[Non-Patent Document 4] J. Rao and K. A. Ross, "Making B+-Trees Cache Conscious in Main Memory," ACM, ACM SIGMOD International Conference on Management of Data, pp. 475-486, 2000

[Non-Patent Document 5] J. Zhou and K. A. Ross, "Implementing Database Operations Using SIMD Instructions," ACM, ACM SIGMOD International Conference on Management of Data, pp. 145-156, 2002

[Non-Patent Document 6] C. Kim, J. Chhugani, N. Stish, E. Sedlar, A. D. Nguyen, T. Kaldewey, V. W. Lee, S. A. Brandt, and P. Dubey, "FAST: Fast Architecture Sensitive Tree Search on Modern CPUs and GPUs," ACM, ACM SIGMOD International Conference on Management of Data, pp. 339-350, 2010

DISCLOSURE OF THE INVENTION

The present inventor examined shortening the time required for inserting entries into a data structure in which search of entries is performed using SIMD instructions. Non-Patent Document 6 does not disclose the method of shortening the time required for inserting entries.

An object of the present invention is to provide an entry insertion apparatus, method, and program for shortening the time required for inserting entries into a data structure in which entry search is performed using SIMD instructions.

An entry insertion apparatus provided by the present invention is an entry insertion apparatus that inserts an entry into a node, the node including a plurality of partial areas in which the number of entries that can be stored is W (W being a positive integer equal to or greater than 2) and from which the entries stored in the plurality of partial areas can be searched for using a single instruction multiple data (SIMD) instruction to execute the same processing for the W entries in parallel. The entry insertion apparatus includes an insertion unit that inserts a new entry into an unsaturated area in which the number of stored entries is 1 or more and less than W among the plurality of partial areas; and a sorting unit that sorts the entries stored in the partial area into which the new entry has been inserted when the partial area is a saturated area storing W entries, and does not sort the entries stored in the partial area into which the new entry has been inserted when the partial area is not the saturated area.

A program provided by the present invention is a program for causing a computer to function as the above-described entry insertion apparatus. The program causes the computer to have a function of each functional unit of the above-described entry insertion apparatus.

A method provided by the present invention is a computer-executable method in which an entry is inserted into a node, the node including a plurality of partial areas in which the number of entries that can be stored is W (W being a positive integer equal to or greater than 2) and from which the entries stored in the plurality of partial areas can be searched for using a single instruction multiple data (SIMD) instruction to execute the same processing for the W entries in parallel. The method includes an insertion step of inserting a new entry into an unsaturated area in which the number of stored entries is 1 or more and less than W among the plurality of partial areas; and a sorting step of sorting the entries stored in the partial area into which the new entry has been inserted when the partial area is a saturated area storing W entries, and not sorting the entries stored in the partial area into which the new entry has been inserted when the partial area is not the saturated area.

According to the present invention, it is possible to provide an entry insertion apparatus, method, and program for shortening the time required for inserting entries into a data structure in which entry search is performed using SIMD instructions in the data structure.

BRIEF DESCRIPTION OF THE DRAWINGS

The above-described object, other objects, characteristics, and advantages become clearer from the preferred exemplary embodiment to be described below and related drawings below.

FIG. 5 is a diagram illustrating an example of the method in which a sorting unit performs comparison between entries using SIMD instructions in Modification example 1.

FIG. 10 is a diagram conceptually illustrating an operation of a deletion unit.

DESCRIPTION OF EXEMPLARY EMBODIMENTS

Hereinafter, exemplary embodiments of the present invention will be described using the drawings. Further, in all the drawings, the same components are denoted with the same reference signs and description thereof will not be repeated.

Exemplary Embodiment 1

Figure 1:
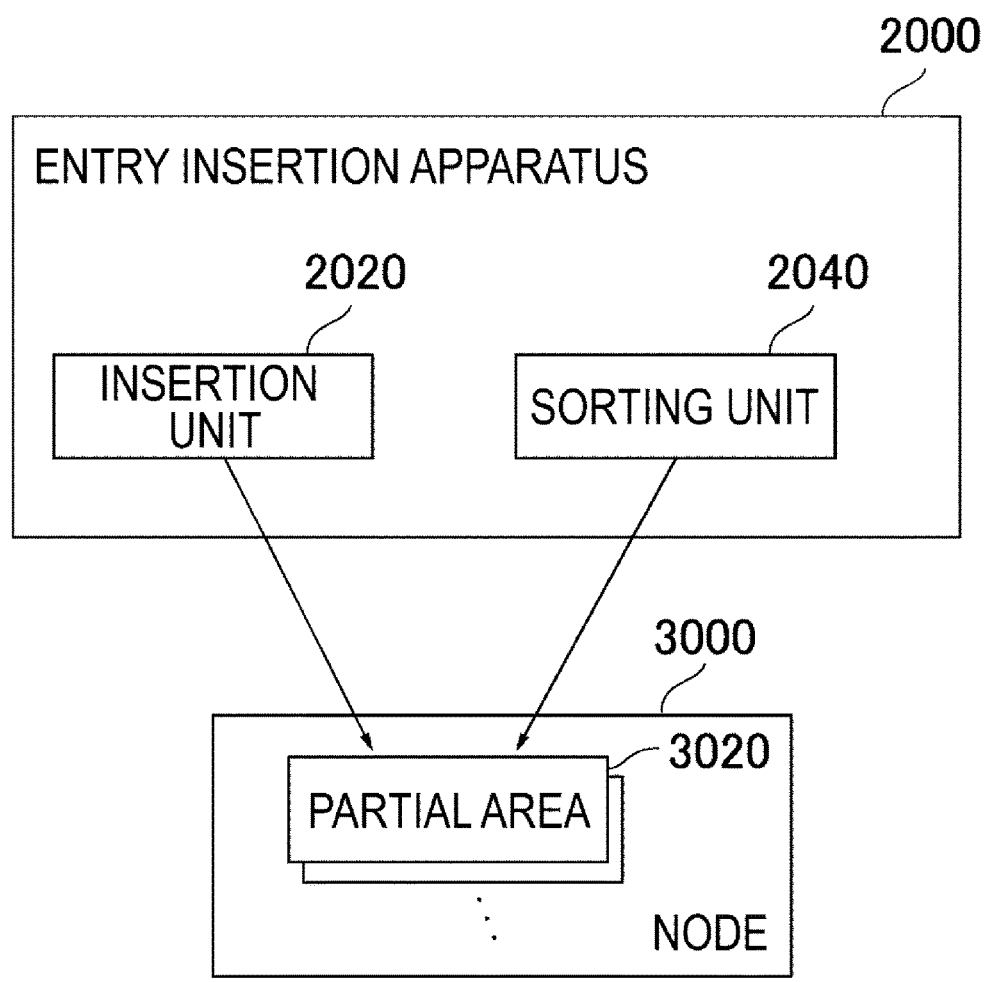
FIG. 1 is a block diagram illustrating an entry insertion apparatus and its use environment according to Exemplary Embodiment 1.

FIG. 1 is a block diagram illustrating an entry insertion apparatus 2000 together with a use environment according to this exemplary embodiment. In FIG. 1, a flow of an arrow shows a flow of information. Further, in FIG. 1, each functional unit indicates a configuration of a function unit rather than a configuration of a hardware unit.

The entry insertion apparatus 2000 inserts an entry into a node 3000. The node 3000 includes a plurality of partial areas 3020. A partial area 3020 stores a plurality of pieces of data. Hereinafter, the data stored in the partial area 3020 is referred to as an entry. The number of entries that can be stored in the partial area 3020 is W (W being a positive integer equal to or greater than 2).

The entries stored in the node 3000 can be searched for using SIMD instructions to execute the same processing on the W entries in parallel.

The entry insertion apparatus 2000 includes an insertion unit 2020. The insertion unit 2020 inserts a new entry into the partial area 3020 in which the number of stored entries is 1 or more and less than W among the plurality of partial areas 3020. Hereinafter, the partial area 3020 of which the number of stored entries is 1 or more and less than W is referred to as an unsaturated area.

When the number of entries stored in the partial area 3020 into which the new entry has been inserted is W, a sorting unit 2040 sorts the entries stored in the partial area 3020. Here, the partial area 3020 in which the number of stored entries is W is referred to as a saturated area. Further, when the partial area 3020 into which the new entry has been inserted is not the saturated area, the sorting unit 2040 does not sort the entries stored in the partial area 3020.

<Description of Specific Operation>

Figure 2:
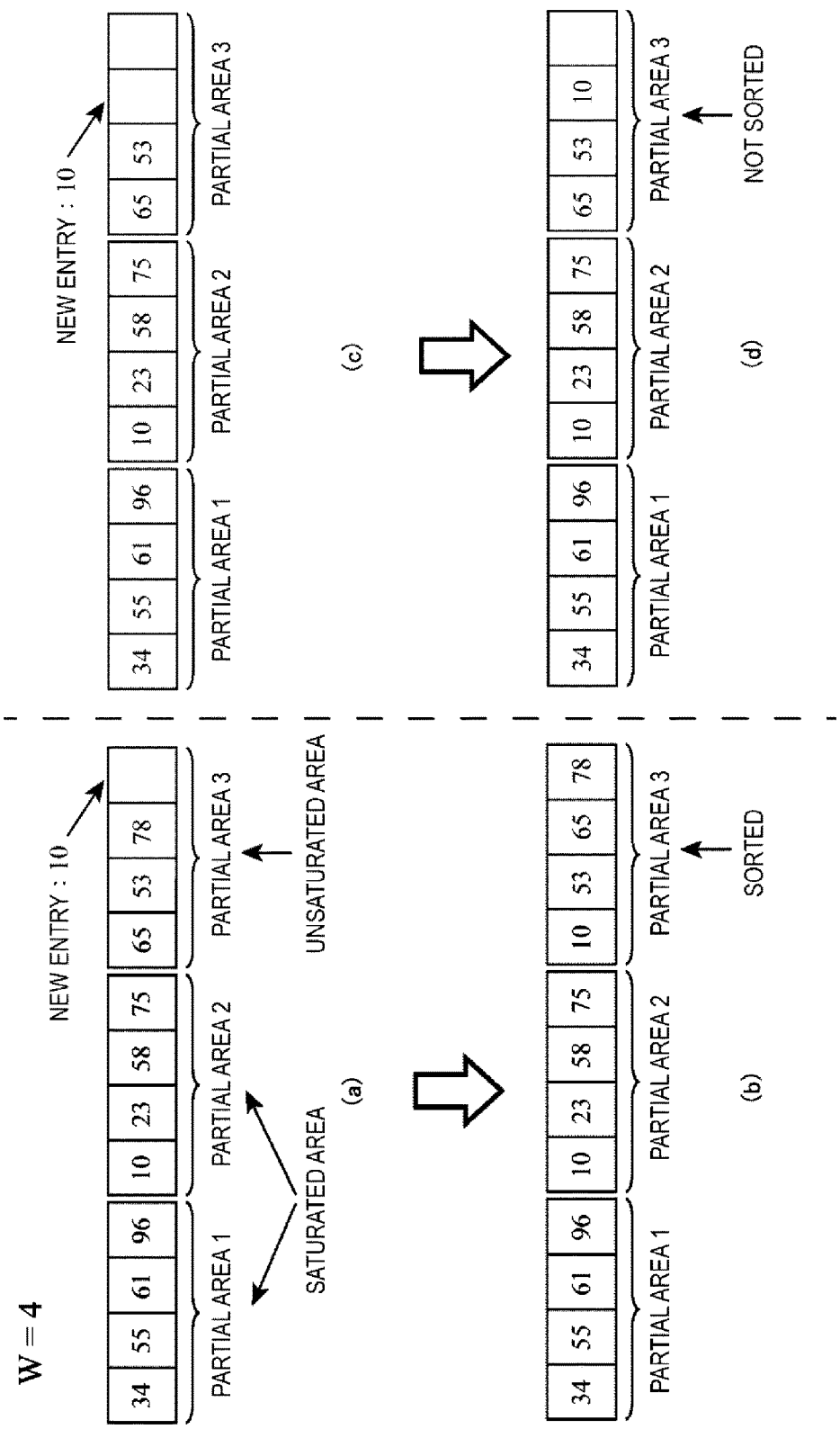
FIG. 2 is a diagram conceptually illustrating an operation of an insertion unit.

FIG. 2 is a diagram conceptually illustrating an operation of the insertion unit 2020. In FIG. 2, the entries are numerical values, such as 34 and 55. Further, in FIG. 2, W indicating the number of entries that can be stored in the partial area 3020 is 4.

In FIG. 2(a), partial areas 1 and 2 are saturated areas, and partial area 3 is an unsaturated area. In FIG. 2(a), the insertion unit 2020 inserts 10 that is a new entry into partial area 3, which is an unsaturated area. In this case, partial area 3 into which the new entry has been inserted becomes the saturated area. Therefore, in FIG. 2(b), the sorting unit 2040 sorts partial area 3. In FIG. 2(b), for example, the sorting unit 2040 sorts partial area 3 in an ascending order of the numerical values of the entries. However, sorting performed by the sorting unit 2040 is not limited to sorting in ascending order.

In FIG. 2(c), partial areas 1 and 2 are saturated areas, and partial area 3 is an unsaturated area. In FIG. 2(c), the insertion unit 2020 inserts 10 that is a new entry into partial area 3, which is an unsaturated area. However, in this case, partial area 3 into which the new entry has been inserted is not a saturated area. Therefore, in FIG. 2(d), the sorting unit 2040 does not sort partial area 3.

<Details of Node 3000>

There are various entries stored in the partial area 3020. For example, the entry is data indicating a numerical value or a character. Further, for example, the entry may be a combination of pieces of data indicating a numerical value or a character. In this case, for example, the entry is a combination of a key used for searching or sorting and a value corresponding to the key.

The node 3000 is, for example, a node that is a component of an index tree. In this case, for example, the entry stored in the node 3000 is a combination of an index and data to which the index is assigned.

There are various methods of implementing partial areas 3020. For example, the partial areas 3020 are implemented as a one-dimensional array. Further, for example, the partial areas 3020 may be implemented in a list structure or the like.

There are various methods of implementing the node 3000. For example, the node 3000 is implemented as a one-dimensional array. In this case, for example, a portion of the one-dimensional array for realizing the node 3000 becomes the partial area 3020. Further, for example, the node 3000 is implemented in a two-dimensional array, a list structure, or the like in which the partial areas 3020 are connected.

<Hardware Configuration of Entry Insertion Apparatus 2000>

Figure 3:
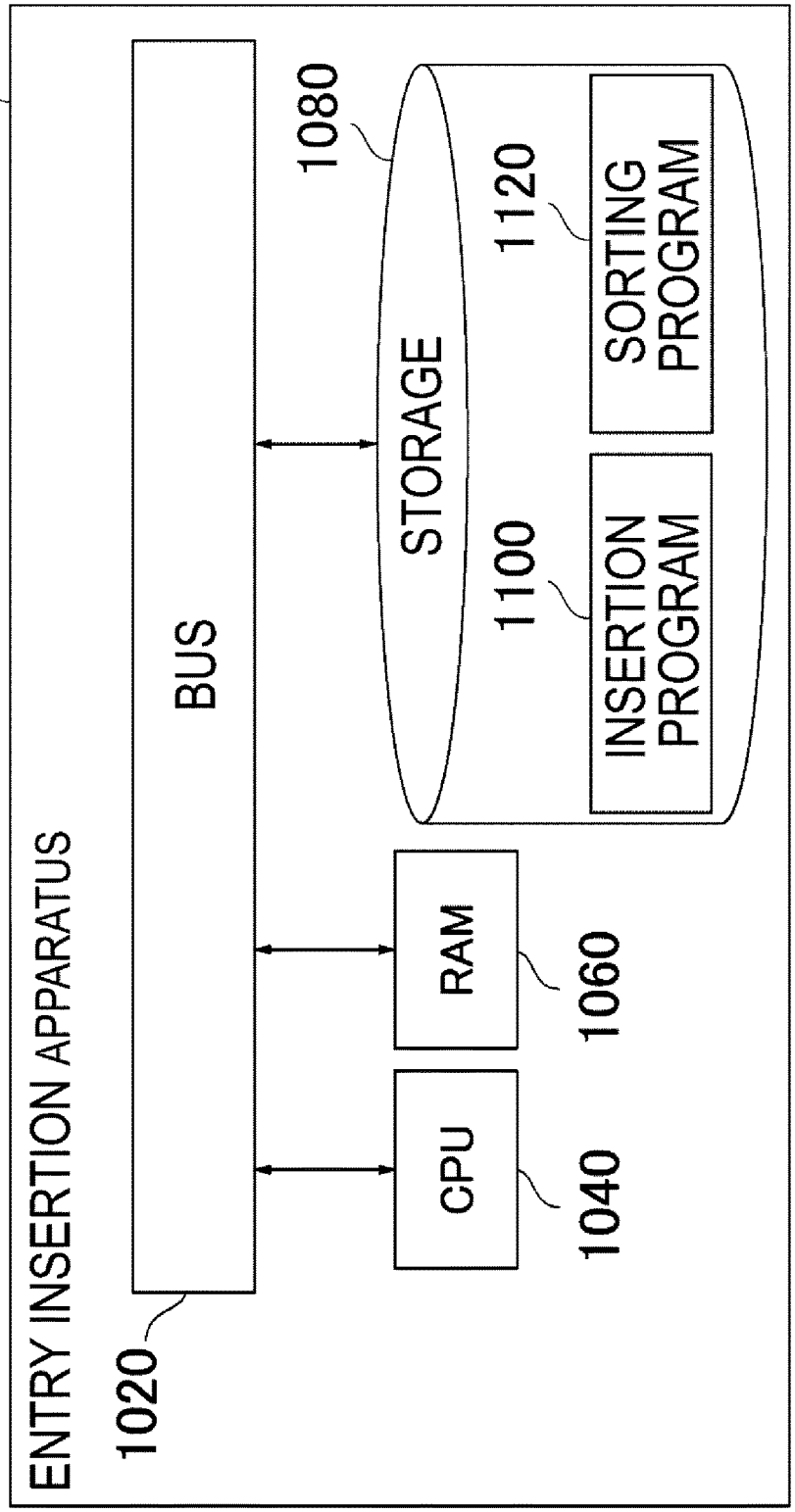
FIG. 3 is a block diagram illustrating an example of a hardware configuration of an entry insertion apparatus according to Exemplary Embodiment 1.

FIG. 3 is a block diagram illustrating an example of a hardware configuration of the entry insertion apparatus 2000 according to Exemplary Embodiment 1. In FIG. 3, the entry insertion apparatus 2000 includes a bus 1020, a CPU 1040, a RAM 1060, and a storage 1080.

The bus 1020 is a transmission path for transmitting or receiving information between each piece of hardware such as the CPU 1040, the RAM 1060, and the storage 1080.

The CPU 1040 executes an insertion program 1100 that realizes a function of the insertion unit 2020 to realize a function of the insertion unit 2020. Further, the CPU 1040 executes a sorting program 1120 that realizes a function of the sorting unit 2040 to realize a function of the sorting unit 2040.

The insertion program 1100 and the sorting program 1120 are stored, for example, in the storage 1080. Also, the insertion program 1100 and the sorting program 1120 are read, for example, to the RAM 1060 by the CPU 1040. The insertion program 1100 or the sorting program 1120 may be stored in the RAM 1060. Further, when the entry insertion apparatus 2000 includes a ROM, the insertion program 1100 or the sorting program 1120 may be stored in the ROM.

For example, the storage 1080 is a storage device such as a hard disk, a USB memory, or a solid state drive (SSD). Further, the storage 1080 may be a storage device such as a RAM or a ROM.

<Flow of Entry Insertion Process>

Figure 4:
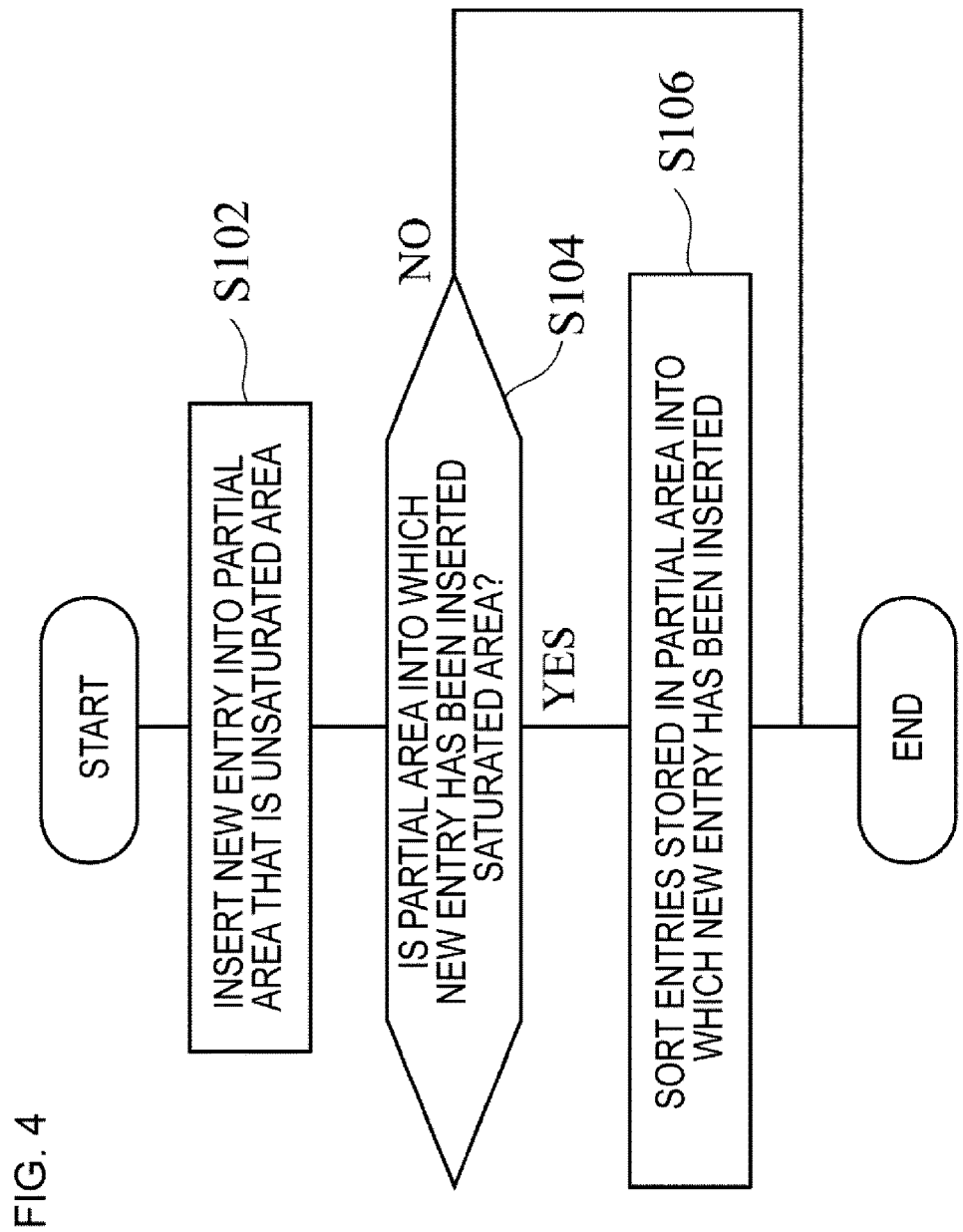
FIG. 4 is a flowchart illustrating an example of a flow of an entry insertion process in the entry insertion apparatus according to Exemplary Embodiment 1.

FIG. 4 is a flowchart illustrating an example of a flow of an entry insertion process in which the entry insertion apparatus 2000 in this embodiment inserts an entry to the node 3000.

In step S102, the insertion unit 2020 inserts a new entry into the partial area 3020 that is an unsaturated area.

In step S104, the sorting unit 2040 determines whether the partial area 3020 into which the new entry has been inserted becomes a saturated area. When the partial area 3020 into which the new entry has been inserted is a saturated area, the entry insertion process proceeds to step S106. When the partial area 3020 into which the new entry has been inserted is not a saturated area, the entry insertion process ends.

In step S106, the sorting unit 2040 sorts the entries stored in the partial area 3020 into which the new entry has been inserted.

<Operational Advantages>

As described above, according to this exemplary embodiment, the entry insertion apparatus 2000 inserts the new entry into the partial area 3020, which is an unsaturated area. Also, when the partial area 3020 into which the new entry has been inserted becomes a saturated area, the entry insertion apparatus 2000 sorts the partial area 3020 into which the new entry has been inserted. Thus, since the entry insertion apparatus 2000 does not sort the entries each time the entry insertion apparatus 2000 inserts the new entry, it is possible to shorten the time required for inserting the entry. Further, since the entry insertion apparatus 2000 can efficiently use SIMD instructions, it is possible to perform sorting in a short time.

Further, since the saturated area of which the number of entries is the number that can be processed at once using SIMD instructions is sorted, an apparatus searching for an entry from the node 3000 can efficiently perform search of the entry using SIMD instructions.

Modification Example 1

The sorting unit 2040 of the entry insertion apparatus 2000 of Exemplary Embodiment 1 may have a function of sorting the saturated area using SIMD instructions. Hereinafter, the entry insertion apparatus 2000 having a function in which the sorting unit 2040 sorts the saturated area using SIMD instructions is referred to as an entry insertion apparatus 2000 of Modification example 1.

For example, the sorting unit 2040 of Modification example 1 compares the entries stored in the saturated area to be sorted using SIMD instructions. Also, the sorting unit 2040 sorts the entries stored in the saturated area using a result of this comparison.

FIG. 5 is a diagram illustrating an example of a method in which the sorting unit 2040 performs comparison between entries using a SIMD instruction in Modification example 1. First, the sorting unit 2040 stores, in a first register, the entries stored in the saturated area. Also, the sorting unit 2040 executes a SIMD instruction to generate a new data string using one or more pieces of data included in the data string stored in the first register. Accordingly, the sorting unit 2040 generates data string 1. Generally, the SIMD instruction to generate a new data string using one or more pieces of data included in a certain data string is called a shuffle instruction.

In the example of FIG. 5, entries "a, b, c, d" are stored in the saturated area. Also, in FIG. 5($a$), the sorting unit 2040 generates new data string 1 "d, a, b, c" using the shuffle instruction.

In FIG. 5($b$), the sorting unit 2040 stores the newly generated data string 1 in a second register. Also, the sorting unit 2040 executes a SIMD instruction to compare each piece of data stored in the first register with each piece of data stored in the second register. By using this SIMD instruction, the sorting unit 2040 can perform comparison of four combinations "a, d", "a, b", "b, c" and "c, d" among each of combinations of entries with one instruction.

Here, in a saturated area in which four entries are stored, the number of combinations of two entries is 6. Therefore, six comparisons are required to compare all the combinations of two entries. As described above, the sorting unit 2040 can perform four comparisons by performing, one time, the SIMD instruction to perform comparison. Therefore, the sorting unit 2040 can perform comparison of all the combinations of two entries by performing, two times, the SIMD instruction to perform comparison for the saturated area in which four entries are stored.

The sorting unit 2040 sorts the entries stored in the saturated area using the result of comparing the entries stored in the saturated area using SIMD instructions. Therefore, for example, the sorting unit 2040 stores information indicating association of the result of comparing entries stored in the saturated area portion with an entry sorting method. Hereinafter, this information is referred to as sorting information. The sorting unit 2040 reads the sorting information based on the result of comparing the entries stored in the saturated area using SIMD instructions. Also, the sorting unit 2040 sorts the entries stored in the saturated area according to the method indicated by the sorting information.

Figure 6:
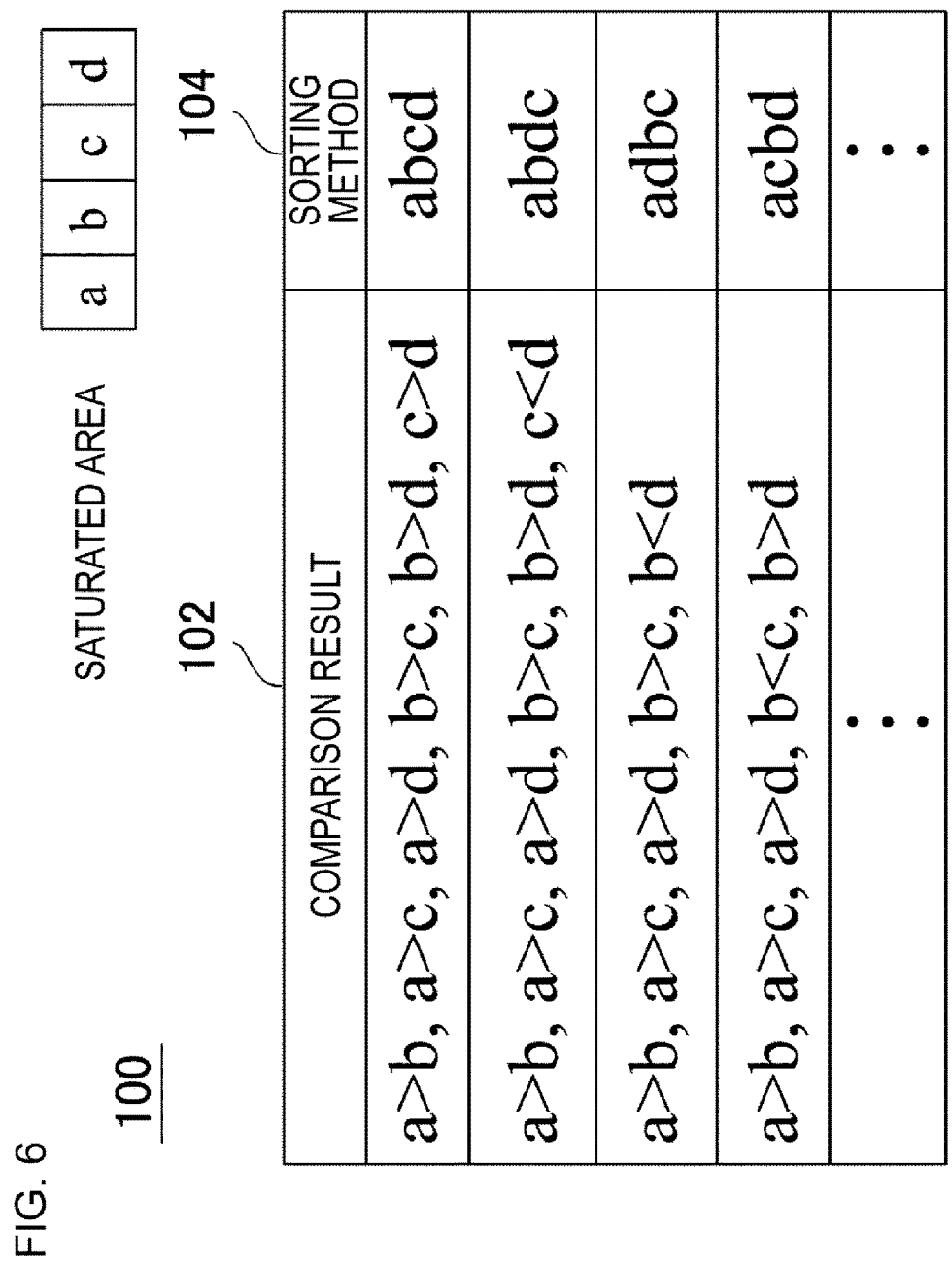
FIG. 6 is a diagram illustrating a configuration of a sorting table.

The sorting information is represented by, for example, a sorting table 100 illustrated in FIG. 6. The sorting table 100 includes a comparison result 102 and a sorting method 104. Here, in the sorting table 100 of FIG. 6, it is assumed that the number of entries included in the saturated area is 4, and the saturated area before sorting includes four entries "a, b, c, d" in this order. Further, the sorting method 104 indicates a method of sorting the entries in ascending order.

For example, when the comparison result of each of the entries is "a>b, a>c, a>d, b>c, b>d, and c<d", a size relationship of "a, b, c, d" is uniquely determined as "a>b>d>c." Therefore, in record 2 of the sorting table 100, the comparison result 102 "a>b, a>c, a>d, b>c, b>d, and c<d," is associated with the sorting method 104, "a, b, d, c"

The sorting method 104 of record 2 indicates that "a, b, c, d" stored in the saturated area can be sorted in ascending order by being sequentially sorted in an order of "a, b, d, c" In this case, the sorting unit 2040 can sort the saturated area in ascending order by exchanging c and d among the entries stored in the saturated area.

<Operational Advantages>

As described above, the entry insertion apparatus 2000 of Modification example 1 sorts the saturated area using SIMD instructions. Thus, the entry insertion apparatus 2000 can sort the saturated area in a short time.

Modification Example 2

The sorting unit 2040 of the entry insertion apparatus 2000 of Exemplary Embodiment 1 may have a function of further sorting the area connecting a plurality of individually sorted saturated areas. The entry insertion apparatus 2000 having a function in which the sorting unit 2040 sorts an area connecting a plurality of saturated areas is referred to as an entry insertion apparatus 2000 of Modification example 2.

For example, the node 3000 is assumed to have two saturated areas 1 and 2. Also, saturated area 1 includes entries in order of "35, 55, 61, 96", and saturated area 2 includes entries in order of "10, 23, 58, 75."

In this case, the sorting unit 2040 sorts an area having "35, 55, 61, 96, 10, 23, 58, 75" that is an area connecting the two saturated areas. For example, the sorting unit 2040 is assumed to sort the entries in ascending order. In this case, the entries stored in the connecting area have an order of "10, 23, 35, 55, 58, 61, 75, 96." As a result, saturated area 1 becomes a saturated area having entries in order of "10, 23, 35, 55", and saturated area 2 becomes a saturated area having entries in order of "58, 61, 75, 96."

<Operational Advantages>

As described above, the entry insertion apparatus 2000 of Modification example 2 further sorts the area connecting a plurality of individually sorted saturated areas. Thus, the entry insertion apparatus 2000 can shorten the time required to search for the entries stored in the node 3000.

For example, a case in which an apparatus that searches the node 3000 for an entry (hereinafter, a search apparatus) searches the node 3000 having two saturated areas 1 and 2 for a maximum entry is considered. First, a case in which the entry insertion apparatus 2000 does not connect saturated areas 1 and 2 to sort saturated areas 1 and 2 is considered. In this case, the search apparatus first acquires 96 stored at an end of saturated area 1 and 75 stored at an end of saturated area 2. Thereafter, the search apparatus determines that 96 is a maximum entry by comparing the two entries.

On the other hand, an area connecting saturated area 1 and saturated area 2 is assumed to have been sorted by the entry insertion apparatus 2000 of Modification example 2 in advance. In this case, even when the search apparatus does not extract the maximum entries from saturated areas 1 and 2, the search apparatus recognizes that 96 that is an entry at the end of saturated area 2 is the maximum entry. Thus, the entry insertion apparatus 2000 of Modification example 2 can shorten the time required to search for entries stored in the node 3000 by sorting the area connecting a plurality of saturated areas.

Modification Example 3

Further, the sorting unit 2040 of the entry insertion apparatus 2000 of Modification example 2 may have a function of sorting the area connecting a plurality of individually sorted saturated areas using SIMD instructions for the plurality of saturated areas. The entry insertion apparatus 2000 in which the sorting unit 2040 has a function of sorting the area connecting a plurality of saturated areas using SIMD instructions is referred to as an entry insertion apparatus 2000 of Modification example 3. In this case, the sorting unit 2040 compares the entries between each of the saturated areas and sorts the area connecting a plurality of saturated areas based on a result of comparing the entries. Further, it is preferable for the number of saturated areas connected and sorted by the sorting unit 2040 to be a multiple of a power of 2.

For example, the sorting unit 2040 is assumed to sort the area connecting saturated area 1 having entries sorted in ascending order such as "a, b, c, d" and saturated area 2 having entries sorted in ascending order such as "e, f, g, h." In this case, the sorting unit 2040 performs, for example, comparison in each combination of one entry in saturated area 1 and one entry in saturated area 2 using a SIMD instruction. Also, the sorting unit 2040 sorts the area connecting the two saturated areas based on a result of comparing the entries of saturated area 1 and saturated area 2.

The sorting unit 2040 of this modification example performs, for example, comparison of two entries using a SIMD instruction using the same method as the sorting unit 2040 of Modification example 1. Further, the sorting unit 2040 of this modification example performs, for example, sorting by reading sorting information based on a result of comparison between entries, similarly to the sorting unit 2040 of Modification example 1.

The sorting unit 2040 sorts the entries stored in each saturated area and then sorts the entries included in the area connecting the plurality of saturated areas, thus reducing processing necessary for sorting of the entries included in the area connecting the saturated areas. For example, saturated areas 1 and 2 described above are sorted in ascending order in advance. Therefore, size relationships "a<b<c<d" and "e<f<g<h" are met. In this case, for example, if "d<e," a size relationship "c<e" is necessarily met. Therefore, when the entries stored in the area connecting the saturated areas are sorted, the number of comparisons between the entries to be performed by the sorting unit 2040 decreases. Further, since patterns of the comparison result stored in the sorting information are reduced, it is possible to decrease the sorting information.

<Operational Advantages>

As described above, with the entry insertion apparatus 2000 of Modification example 3, it is possible to sort the entries stored in the area connecting the plurality of individually sorted saturated areas in a short time by sorting the entries stored in the area connecting the plurality of saturated areas using SIMD instructions.

Exemplary Embodiment 2

Figure 7:
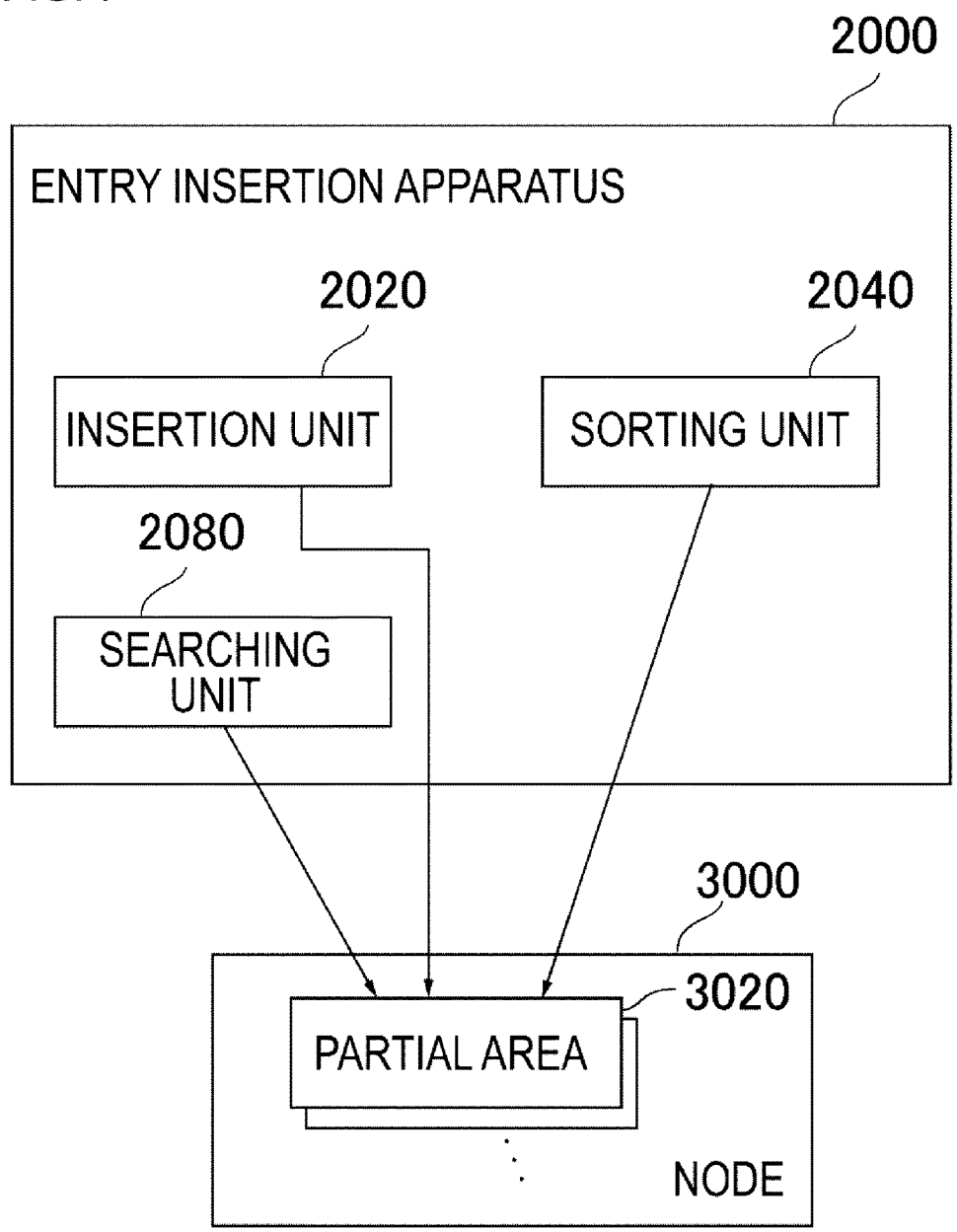
FIG. 7 is a block diagram illustrating an entry insertion apparatus and its use environment according to Exemplary Embodiment 2.

FIG. 7 is a block diagram illustrating an entry insertion apparatus 2000 and its use environment according to this exemplary embodiment. Functional units illustrated in FIG. 7 of which the reference signs are the same as those of the functional units in FIG. 1 are assumed to have the same functions as the functional units in FIG. 1. Further, in FIG. 7, each functional unit indicates a configuration of a function unit rather than a configuration of a hardware unit.

The entry insertion apparatus 2000 of this exemplary embodiment further includes a searching unit 2080. The searching unit 2080 searches the node 3000 for an entry. In this case, the searching unit 2080 performs search of the saturated area and search of the unsaturated area using different methods.

<Description of Specific Operation>

Here, an operation of the entry insertion apparatus 2000 will be conceptually described using a specific example. In this example, the searching unit 2080 searches for an entry greater than 60 from the node 3000.

Figure 8:
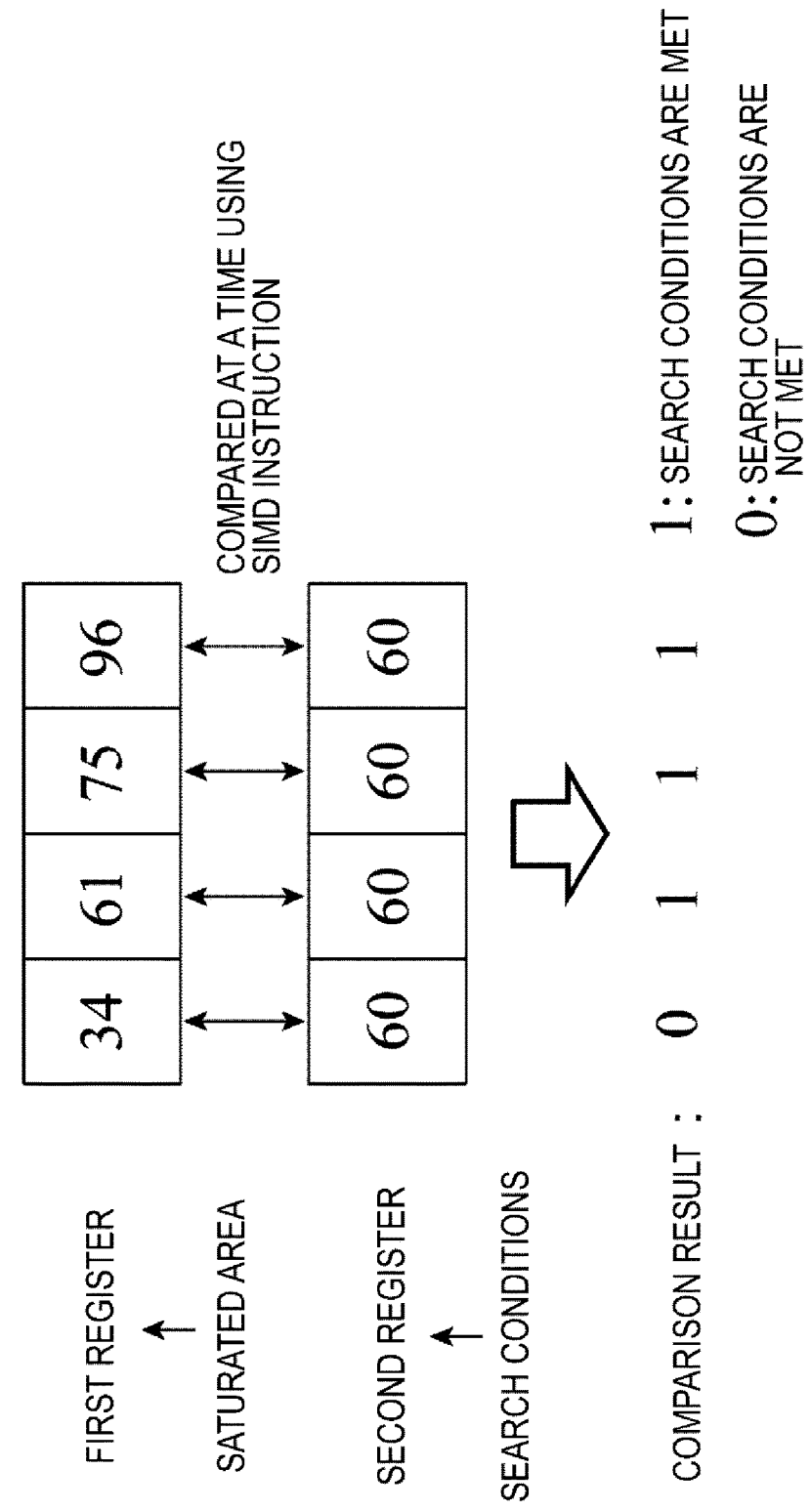
FIG. 8 is a diagram conceptually illustrating an operation of search performed on a saturated area by a searching unit.

FIG. 8 is a diagram conceptually illustrating an operation of search performed on a saturated area by the searching unit 2080. In FIG. 8, the searching unit 2080 uses a SIMD instruction to compare values stored in two registers and output a result. Specifically, first, entries of the saturated area are supplied to a first register. Then, a value indicating search conditions is supplied to a second register. Then, a SIMD instruction to "compare each value supplied to the first register with the value supplied to the same position in the second register, and output 1 if the value supplied to the first register is greater than the value supplied to the second register and output 0 if otherwise" is executed.

As a result of comparison using the SIMD instruction, 0 is output for 34, and 1 is output for 61, 75 and 96. Also, the searching unit 2080 extracts three entries of "61, 75, and 96" for which an output result is 1 as entries meeting the search conditions. Thus, the searching unit 2080 extracts the entries meeting the search conditions "greater than 60" from among the entries stored in the saturated area using one SIMD instruction.

On the other hand, the searching unit 2080 performs search for the unsaturated area, for example, without using SIMD instructions. In this case, the searching unit 2080 individually performs, for example, comparison of each entry with 60 indicated by the search conditions using a single instruction single data (SISD) instruction that deals with one piece of data at a time.

Then, the searching unit 2080 sets both of the entry extracted through searching the saturated area and the entry extracted through searching the unsaturated area as a search result.

<Operational Advantages>

As described above, according to this exemplary embodiment, the entry insertion apparatus 2000 searches the node 3000 for the entry by searching the saturated area and searching the unsaturated area using different methods. Thus, the entry insertion apparatus 2000 can search the saturated area using a method suitable for the saturated area and search the unsaturated area using a method suitable for the unsaturated area. Accordingly, the entry insertion apparatus 2000 can shorten the time required for search in comparison with a case in which the search is performed on the saturated area and the unsaturated area using the same method.

For example, the searching unit 2080 searches the saturated area using SIMD instructions. On the other hand, for example, the searching unit 2080 searches the unsaturated area using the SISD instruction. Generally, SIMD instructions require a longer processing time than SISD instructions. Therefore, when the number of entries desired to be processed is small, a total processing time may be shorter in a case in which processing is individually performed using SISD instructions than in a case in which processing is collectively performed using SIMD instructions. Therefore, the searching unit 2080 performs the search of the unsaturated area, for example, using SISD instructions.

Modification Example 4

For example, there is the following modification example of the entry insertion apparatus 2000 of this exemplary embodiment. The following modification example of the entry insertion apparatus 2000 of this exemplary embodiment is referred to as an entry insertion apparatus 2000 of Modification example 4.

A searching unit 2080 of the entry insertion apparatus 2000 of Modification example 4 identifies an entry indicating a maximum value or an entry indicating a minimum value from among a plurality of entries meeting predetermined conditions in the saturated area based on the position in which each entry is stored.

Here, the position in which each entry is stored is not limited to a physical position on hardware such as a storage apparatus in which the entry is stored. For example, when the partial area 3020 is realized in a one-dimensional array, the position of the entry is indicated, for example, by a subscript of the array.

<Description of Specific Operation>

An operation of the searching unit 2080 of Modification example 4 will be described in the above-described example using FIG. 8. Among the entries included in the saturated area illustrated in FIG. 8, entries meeting predetermined conditions "an entry is greater than 60" illustrated in FIG. 8 are three entries "61, 75, and 96," as described above.

A method in which the searching unit 2080 of Modification example 4 identifies an entry indicating a maximum value from among three entries of "61, 75, and 96" will be described. Here, the saturated area in FIG. 8 is sorted in the ascending order of values. Therefore, among the entries stored in the saturated area, the entry stored in a rearward position indicates a greater value. Therefore, the searching unit 2080 can identify 96 stored in the rearmost position among the entries meeting the predetermined conditions as the entry indicating the maximum value.

Then, a method in which the searching unit 2080 of Modification example 4 identifies the entry indicating a minimum value from the three entries will be described. The saturated area illustrated in FIG. 8 is sorted in the ascending order of values as described above. Therefore, among the entries stored in the saturated area, the entry stored toward a front position indicates a smaller value. Therefore, the searching unit 2080 can identify 61 stored in the foremost position as the entry indicating the minimum value.

<Operational Advantages>

In the entry insertion apparatus 2000 of Modification example 4, the searching unit 2080 identifies the entry indicating the maximum value or the entry indicating the minimum value from the plurality of entries meeting the predetermined conditions in the saturated area. In this case, the entry insertion apparatus 2000 identifies the entry indicating the maximum value or the minimum value based on the position in which each entry meeting the predetermined conditions is stored. Therefore, the entry insertion apparatus 2000 does not perform comparison of each of entries meeting the predetermined conditions. Accordingly, the entry insertion apparatus 2000 can shorten the time required for a process of identifying the entry indicating the maximum value or the entry indicating the minimum value from among the plurality of entries meeting the predetermined conditions in the saturated area.

Exemplary Embodiment 3

Figure 9:
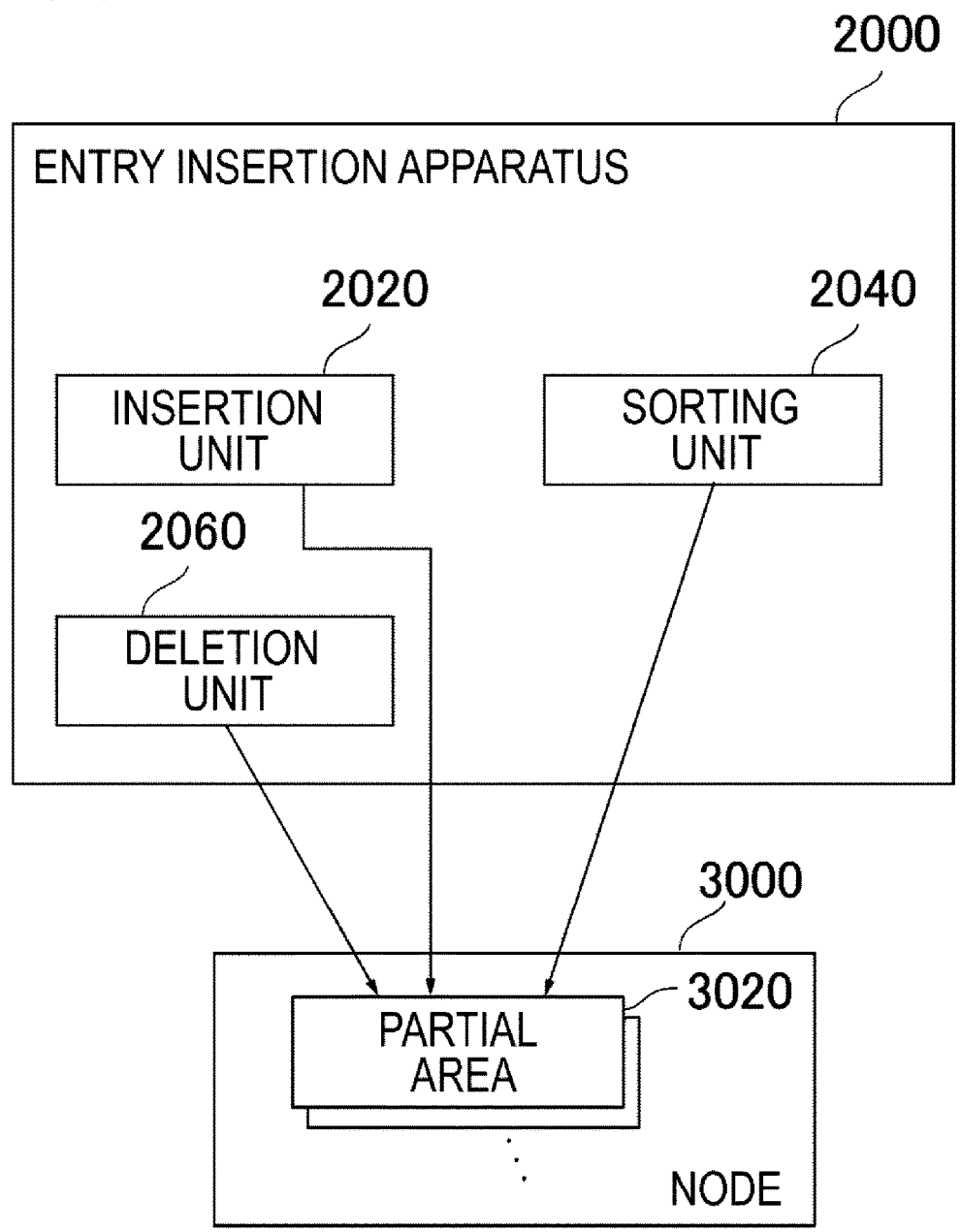
FIG. 9 is a block diagram illustrating an entry insertion apparatus and its use environment according to Exemplary Embodiment 3.

FIG. 9 is a block diagram illustrating an entry insertion apparatus 2000 and its use environment according to this exemplary embodiment. Functional units illustrated in FIG. 9 of which the reference signs are the same as those of the functional units in FIG. 1 are assumed to have the same functions as the functional units in FIG. 1. Further, in FIG. 9, each functional unit indicates a configuration of a function unit rather than a configuration of a hardware unit.

The entry insertion apparatus 2000 of this exemplary embodiment further includes a deletion unit 2060. The deletion unit 2060 overwrites an entry to be deleted, which is stored in the saturated area, with any entry stored in the unsaturated area. Accordingly, the searching unit 2080 deletes the entry to be deleted.

<Description of Specific Operation>

FIG. 10 is a diagram conceptually illustrating an operation of the deletion unit 2060. In FIG. 10, partial area 1 is a saturated area, and partial area 2 is an unsaturated area. In FIG. 10, an entry 58 stored in partial area 1 is assumed to be an entry to be deleted. FIG. 10(a) is a diagram illustrating a node 3000 before the deletion unit 2060 deletes the entry to be deleted.

FIG. 10(b) is a diagram illustrating an operation in which the deletion unit 2060 deletes the entry to be deleted. The deletion unit 2060 overwrites the entry to be deleted with an entry 53 stored in partial area 2, which is an unsaturated area.

<Operational Advantages>

As described above, according to this exemplary embodiment, when the entry insertion apparatus 2000 deletes an entry to be deleted that is stored in the saturated area, the entry insertion apparatus 2000 deletes the entry to be deleted by overwriting the entry to be deleted with the entry stored in the unsaturated area. Accordingly, the saturated area in which the entry to be deleted is stored remains as the saturated area even after the entry is deleted. Therefore, the entry insertion apparatus 2000 can prevent the saturated area from becoming an unsaturated area when an entry has been deleted. Thus, the entry insertion apparatus 2000 can prevent the time required to search for the entry stored in the node 3000 from being longer.

Exemplary Embodiment 4

Figure 11:
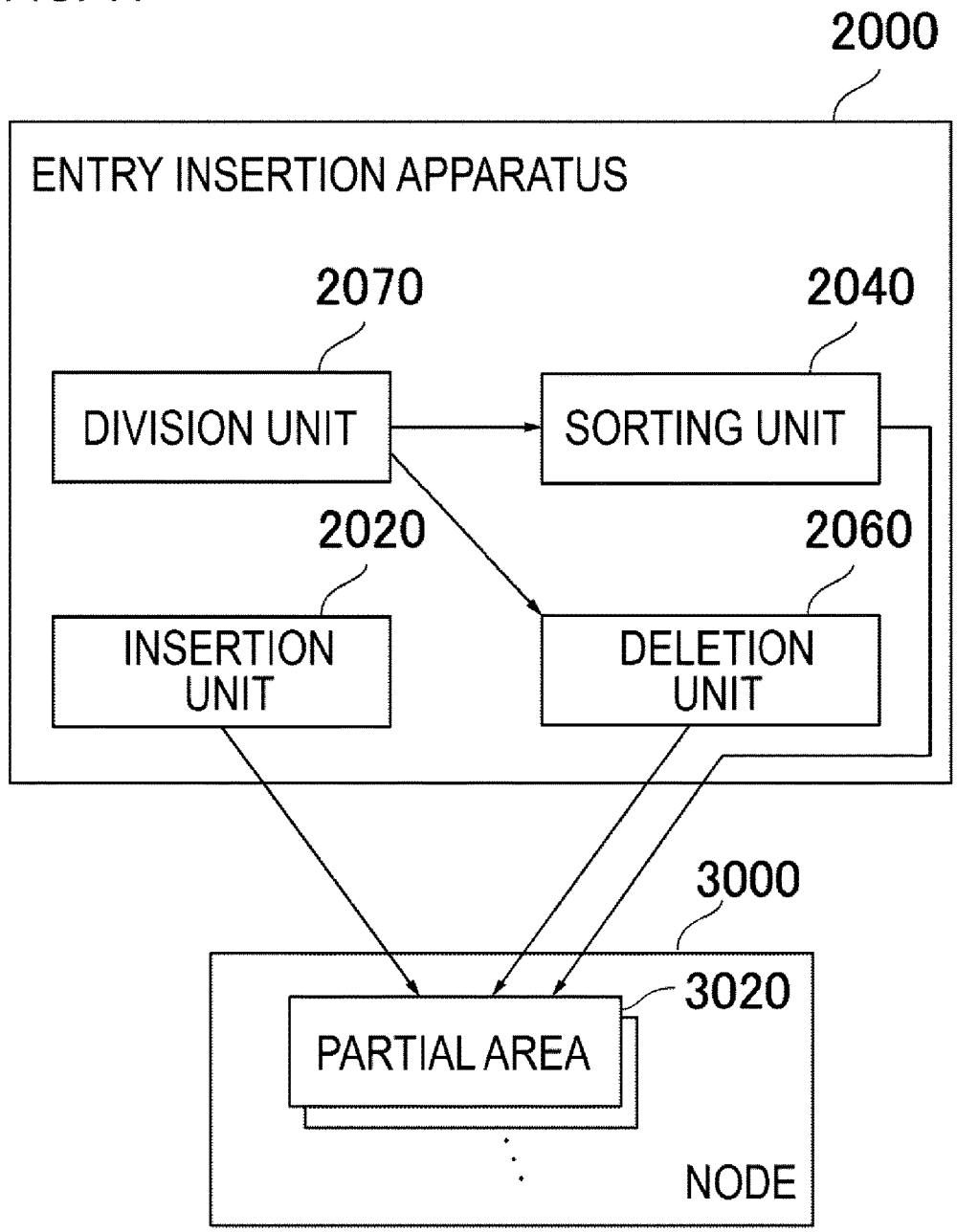
FIG. 11 is a block diagram illustrating an entry insertion apparatus and its use environment according to Exemplary Embodiment 4.

FIG. 11 is a block diagram illustrating an entry insertion apparatus 2000 and its use environment according to this exemplary embodiment. Functional units illustrated in FIG. 11 of which the reference signs are the same as those of the functional units in FIG. 9 are assumed to have the same functions as the functional units in FIG. 9. Further, in FIG. 11, each functional unit indicates a configuration of a function unit rather than a configuration of a hardware unit.

The entry insertion apparatus 2000 of this exemplary embodiment includes a division unit 2070. The division unit 2070 causes the deletion unit 2060 to delete an entry meeting predetermined conditions from each partial area 3020. Further, when the partial area 3020 from which the entry has been deleted is a saturated area, the division unit 2070 causes the sorting unit 2040 to sort the partial area 3020. Thus, the division unit 2070 divides the node 3000.

There are various timings at which the division unit 2070 causes the sorting unit 2040 to sort the saturated area. For example, after the deletion of the entries for one partial area 3020 ends, the division unit 2070 causes the sorting unit 2040 to sort the partial area 3020 when the partial area 3020 is a saturated area. Further, for example, after the deletion of the entries for all partial areas 3020 ends, the division unit 2070 may cause the sorting unit 2040 to sort each saturated area.

When the deletion unit 2060 deletes an entry to be deleted that is stored in the unsaturated area, the deletion unit 2060 removes the entry to be deleted.

The entry insertion apparatus 2000 moves, for example, the entry meeting predetermined conditions to the other node 3000. Accordingly, only nodes not meeting the predetermined conditions remain in the original node 3000. For example, the entry insertion apparatus 2000 prepares for a new node 3000 and moves the entries meeting the predetermined conditions to the new node 3000. Thus, the entry insertion apparatus 2000 can divide the entries meeting the predetermined conditions and the entries not meeting the predetermined conditions into separate nodes 3000. Further, the entry insertion apparatus 2000 may not move the entries meeting the predetermined conditions to the other node 3000.

<Flow of Division Process>

Figure 12:
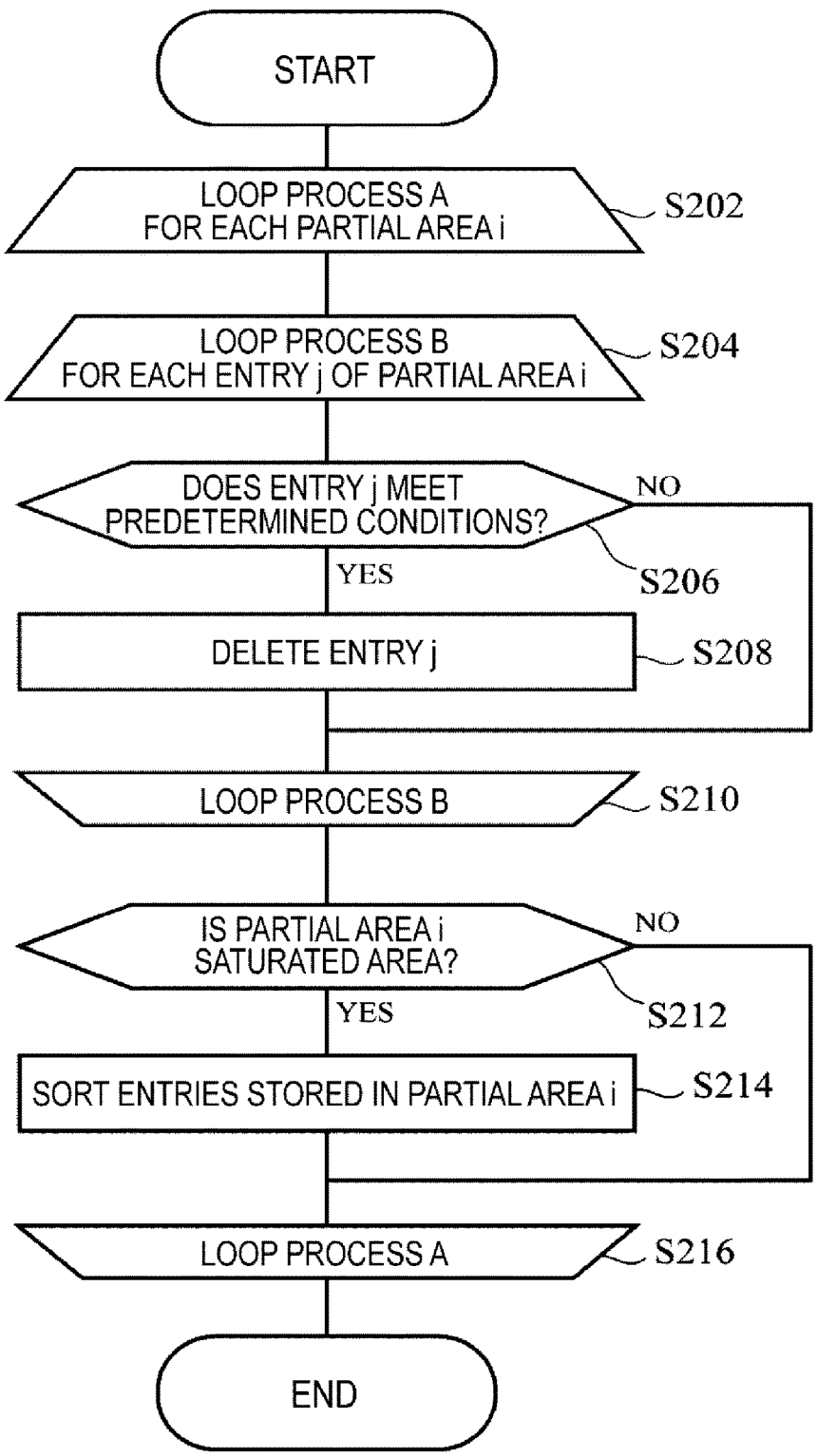
FIG. 12 is a flowchart illustrating an example of a flow of a division process performed by a division unit.

FIG. 12 is a flowchart illustrating an example of a flow of a division process performed by the division unit 2070.

Steps S202 to S216 are loop process A performed on each partial area 3020 included in the node 3000. In step S202, the division unit 2070 determines whether loop process A has been performed on all partial areas 3020 included in the node 3000. When loop process A has already been performed on all the partial areas 3020 included in the node 3000, the division process ends.

On the other hand, when there are the partial areas 3020 that are not yet targets of loop process A in the node 3000, the division unit 2070 selects one of the partial areas 3020 that are not yet targets of loop process A. Hereinafter, the partial area 3020 selected in step S202 is referred to as partial area i. Then, the division process proceeds to step S204.

Steps S204 to S210 are loop process B performed on each entry stored in partial area i. In step S204, the division unit 2070 determines whether loop process B has been performed on all entries stored in partial area i. When loop process B has been already performed on all the entries stored in partial area i, the division process proceeds to step S212.

On the other hand, when there are entries that are not targets of loop process B in partial area i, the division unit 2070 selects one of the entries that are not targets of loop process A. Hereinafter, the entry selected in step S204 is referred to as entry j. Also, the division process proceeds to step S206.

In step S206, the division unit 2070 determines whether entry j meets predetermined conditions. When entry j meets predetermined conditions, the division process proceeds to step S208. When entry j does not meet predetermined conditions, the division process proceeds to step S210.

In step S208, the deletion unit 2060 deletes entry j.

Step S210 is a termination of loop process B. The division process returns to step S204.

In step S212, the division unit 2070 determines whether partial area i is a saturated area or not. When partial area i is a saturated area, the division process proceeds to step S214. On the other hand, when partial area i is not a saturated area, the division process proceeds to step S216.

In step S214, the sorting unit 2040 sorts partial area i.

Step S216 is a termination of loop process A. The division process returns to step S202.

<Operational Advantages>

With the above-described configuration, according to this exemplary embodiment, the entry insertion apparatus 2000 deletes the entry meeting the predetermined conditions from each partial area 3020 using the deletion unit 2060. By deleting the entry using the deletion unit 2060, the entry insertion apparatus 2000 prevents the saturated area from being an unsaturated area after deleting the entry.

Further, when the partial area 3020 from which the entry has been deleted is a saturated area, the entry insertion apparatus 2000 sorts the partial area 3020 from which the entry has been deleted, using the sorting unit 2040. Thus, the entry insertion apparatus 2000 maintains a state in which the saturated area has been sorted.

Thus, the entry insertion apparatus 2000 can prevent the time required to search for an entry from the node 3000 from increasing after dividing the node 3000.

While the exemplary embodiments of the present invention have been described with reference to the drawings, these are illustrations of the present invention, and a combination of the above-described exemplary embodiments, and various configurations other than the above-described exemplary embodiments may be adopted.

Hereinafter, examples of reference embodiments are noted.

1. An entry insertion apparatus that inserts an entry into a node, the node including a plurality of partial areas in which the number of entries that can be stored is W (W being a positive integer equal to or greater than 2) and from which the entries stored in the plurality of partial areas can be searched for using a single instruction multiple data (SIMD) instruction to execute the same processing for the W entries in parallel, the entry insertion apparatus including:
an insertion unit that inserts a new entry into an unsaturated area in which the number of stored entries is 1 or more and less than W among the plurality of partial areas; and
a sorting unit that sorts the entries stored in the partial area into which the new entry has been inserted when the partial area is a saturated area storing W entries, and does not sort the entries stored in the partial area into which the new entry has been inserted when the partial area is not the saturated area.

2. The entry insertion apparatus described in 1, wherein the sorting unit sorts the saturated area using SIMD instructions.

3. The entry insertion apparatus described in 1 or 2, wherein the sorting unit sorts an area connecting a plurality of individually sorted saturated areas.

4. The entry insertion apparatus described in 3, wherein the sorting unit compares the entries between each of the saturated areas using SIMD instructions for the plurality of individually sorted saturated areas, and sorts the area connecting the plurality of saturated areas based on a result of comparing the entries.

5. The entry insertion apparatus according to any one of 1 to 4, further including: a searching unit that performs searching using different methods in a case in which the saturated area is searched for an entry and a case in which the unsaturated area is searched for an entry.

6. The entry insertion apparatus described in 5, wherein the searching unit determines an entry indicating a maximum value or an entry indicating a minimum value, based on positions in which the plurality of entries are respectively stored, from among a plurality of entries meeting predetermined conditions in the saturated area.

7. The entry insertion apparatus described in any one of 1 to 6, including: a deletion unit that deletes an entry to be deleted which is stored in the saturated area by overwriting the entry to be deleted with an entry stored in the unsaturated area.

8. The entry insertion apparatus described in 7, including: a division unit that causes the deletion unit to delete the entry meeting predetermined conditions from each partial area, and causes the sorting unit to sort the partial area from which the entry has been deleted when the partial area is the saturated area.

9. A program for causing a computer to function as an entry insertion apparatus that inserts an entry into a node, the node including a plurality of partial areas in which the number of entries that can be stored is W (W being a positive integer equal to or greater than 2) and from which the entries stored in the plurality of partial areas can be searched for using a single instruction multiple data (SIMD) instruction to execute the same processing for the W entries in parallel, the program causing the computer to include:
an insertion function of inserting a new entry into an unsaturated area in which the number of stored entries is 1 or more and less than W among the plurality of partial areas; and
a sorting function of sorting the entries stored in the partial area into which the new entry has been inserted when the partial area is a saturated area storing W entries, and not sorting the entries stored in the partial area into which the new entry has been inserted when the partial area is not the saturated area.

10. The program described in 9, wherein the sorting function sorts the saturated area using SIMD instructions.

11. The program described in 9 or 10, wherein the sorting function sorts an area connecting a plurality of individually sorted saturated areas.

12. The program described in 11, wherein the sorting function compares the entries between each of the saturated areas using SIMD instructions for the plurality of individually sorted saturated areas, and sorts the area connecting the plurality of saturated areas based on a result of comparing the entries.

13. The program described in any one of 9 to 12, further including: a searching function of performing searching using different methods in a case in which the saturated area is searched for an entry and a case in which the unsaturated area is searched for an entry.

14. The program described in 13, wherein the searching function determines an entry indicating a maximum value or an entry indicating a minimum value, based on positions in which the plurality of entries are respectively stored, from among a plurality of entries meeting predetermined conditions in the saturated area.

15. The program described in any one of 9 to 14, including: a deletion function of deleting an entry to be deleted which is stored in the saturated area by overwriting the entry to be deleted with an entry stored in the unsaturated area.

16. The program described in 15, including: a division function of causing the deletion function to delete the entry meeting predetermined conditions from each partial area, and causing the sorting function to sort the partial area from which the entry has been deleted when the partial area is the saturated area.

17. A method performed by a computer inserting an entry into a node, the node including a plurality of partial areas in which the number of entries that can be stored is W (W being a positive integer equal to or greater than 2) and from which the entries stored in the plurality of partial areas can be searched for using a single instruction multiple data (SIMD) instruction to execute the same processing for the W entries in parallel, the method including:
an insertion step of inserting a new entry into an unsaturated area in which the number of stored entries is 1 or more and less than W among the plurality of partial areas; and a sorting step of sorting the entries stored in the partial area into which the new entry has been inserted when the partial area is a saturated area storing W entries, and not sorting the entries stored in the partial area into which the new entry has been inserted when the partial area is not the saturated area.

18. The method described in 17, wherein the sorting step includes sorting the saturated area using SIMD instructions.

19. The method described in 17 or 18, wherein the sorting step includes sorting an area connecting a plurality of individually sorted saturated areas.

20. The method described in 19, wherein the sorting step includes comparing the entries between each of the saturated areas using SIMD instructions for the plurality of individually sorted saturated areas, and sorting the area connecting the plurality of saturated areas based on a result of comparing the entries.

21. The method described in any one of 17 to 20, further including: a searching step of performing searching using different methods in a case in which the saturated area is searched for an entry and a case in which the unsaturated area is searched for an entry.

22. The method described in 21, wherein the searching step includes determining an entry indicating a maximum value or an entry indicating a minimum value, based on positions in which the plurality of entries are respectively stored, from among a plurality of entries meeting predetermined conditions in the saturated area.

23. The method described in any one of 17 to 22, including: a deletion step of deleting an entry to be deleted which is stored in the saturated area by overwriting the entry to be deleted with an entry stored in the unsaturated area.

24. The method described in 23, including: a division step of causing the deletion step to delete the entry meeting predetermined conditions from each partial area, and causing the sorting step to sort the partial area from which the entry has been deleted when the partial area is the saturated area.

Priority is claimed on Japanese Patent Application No. 2012-229060, filed Oct. 16, 2012, the content of which is incorporated herein by reference.

What is claimed is:

1. An entry insertion apparatus comprising:
a processor in which single instruction multiple data (SIMD) instructions are implemented, a single execution of each SIMD instruction being applied to W data in parallel;
a storage unit implemented at least by the processor storing a node that includes a plurality of partial areas, the number of entries W that can be stored in each partial area is a positive integer equal to or greater than 2, all data in each partial area being able to be searched by a single execution of a SIMD instruction;
an insertion unit implemented at least by the processor and that inserts a new entry into an unsaturated area in which the number of stored entries is 1 or more and less than W among the plurality of partial areas; and
a sorting unit causing the processor to execute a SIMD instruction of sorting in parallel the entries stored in the partial area when the insertion of the new entry into the partial area render the partial area become a saturated area, which stores W entries, and not causing the processor to execute the SIMD instruction of sorting in parallel the entries stored in the partial area when the insertion of the new entry into the partial area does not render the partial area become the saturated area.

2. The entry insertion apparatus according to claim 1, wherein the sorting unit sorts the saturated area using SIMD instructions.

3. The entry insertion apparatus according to claim 1, wherein the sorting unit sorts an area connecting a plurality of individually sorted saturated areas.

4. The entry insertion apparatus according to claim 3, wherein the sorting unit compares the entries between each of the saturated areas using SIMD instructions for the plurality of individually sorted saturated areas, and sorts the area connecting the plurality of saturated areas based on a result of comparing the entries.

5. The entry insertion apparatus according to claim 1, further comprising:
a searching unit that performs searching using different methods in a case in which the saturated area is searched for an entry and a case in which the unsaturated area is searched for an entry.

6. The entry insertion apparatus according to claim 5, wherein the searching unit determines an entry indicating a maximum value or an entry indicating a minimum value, based on positions in which the plurality of entries are respectively stored, from among a plurality of entries meeting predetermined conditions in the saturated area.

7. The entry insertion apparatus according to claim 1, comprising:
a deletion unit that deletes an entry to be deleted which is stored in the saturated area by overwriting the entry to be deleted with an entry stored in the unsaturated area.

8. The entry insertion apparatus according to claim 7, comprising:
a division unit that causes the deletion unit to delete the entry meeting predetermined conditions from each partial area, and causes the sorting unit to sort the partial area from which the entry has been deleted when the partial area is the saturated area.

9. A non-transitory computer-readable storage medium storing a program for causing a computer in which single instruction multiple data (SIMD) instructions are implemented to:
apply a single execution of each SIMD instruction being applied to W data in parallel;
store a node that includes a plurality of partial areas, the number of entries W that can be stored in each partial area is a positive integer equal to or greater than 2, all data in each partial area being able to be searched by a single execution of a SIMD instruction;
insert a new entry into an unsaturated area in which the number of stored entries is 1 or more and less than W among the plurality of partial areas;
execute a SIMD instruction of sorting in parallel the entries stored in the partial area when the insertion of the new entry into the partial area render the partial area become is a saturated area, which stores W entries; and
not execute the SIMD instruction of sorting in parallel the entries stored in the partial when the insertion of the new entry into the partial area does not render the partial area become the saturated area.

10. A method performed by a computer in which single instruction multiple data (SIMD) instructions are implemented, comprising:
applying a single execution of each SIMD instruction being applied to W data in parallel;
storing a node that includes a plurality of partial areas, the number of entries W that can be stored in each partial area is a positive integer equal to or greater than 2, all data in each partial area being able to be searched by a single execution of a SIMD instruction;

inserting a new entry into an unsaturated area in which the number of stored entries is 1 or more and less than W among the plurality of partial areas;

executing a SIMD instruction of sorting in parallel the entries stored in the partial area when the insertion of the new entry into the partial area render the partial area become is a saturated area, which stores W entries; and not executing the SIMD instruction of sorting in parallel the entries stored in the partial when the insertion of the new entry into the partial area does not render the partial area become the saturated area.

\* \* \* \* \*